(No Model.) 2 Sheets—Sheet 1.

H. ORPEN.
TYPE WRITING MACHINE.

No. 284,570. Patented Sept. 4, 1883.

Attest:
Wm. F. Sayers
E. H. Gallaher

Inventor:
Henry Orpen
By Knight Bros
Attys (No Model.) 2 Sheets—Sheet 2.
H. ORPEN.
TYPE WRITING MACHINE.
No. 284,570. Patented Sept. 4, 1883.
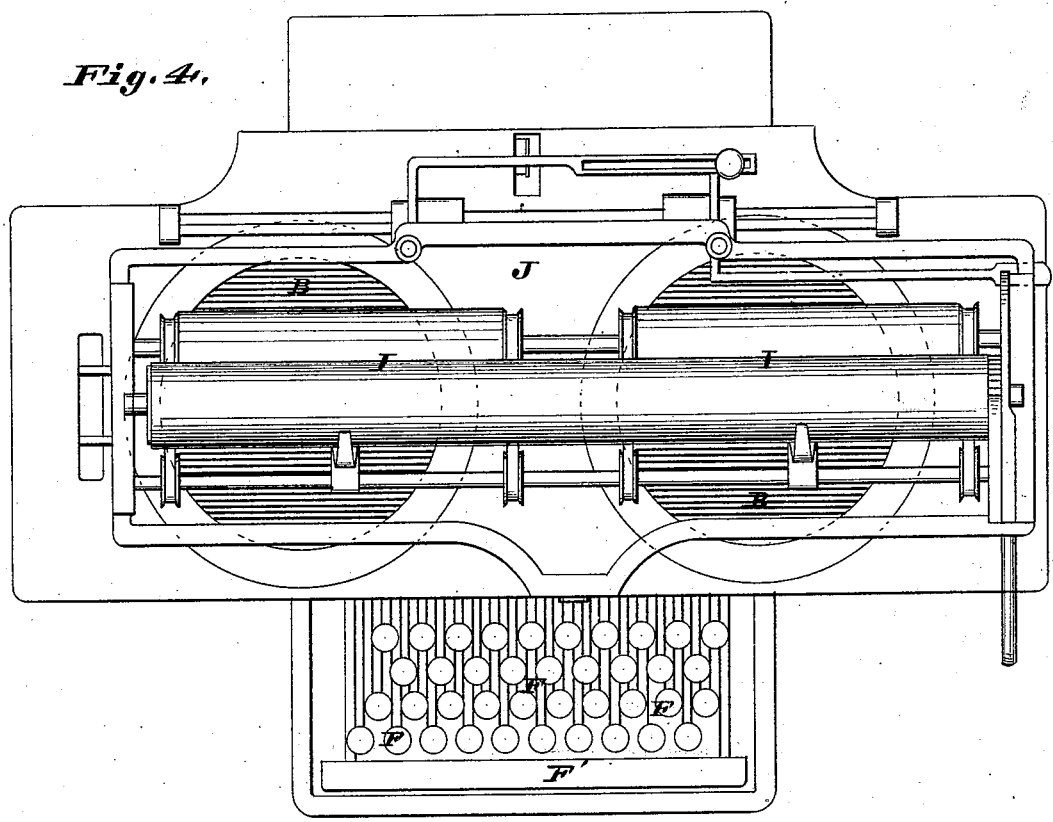
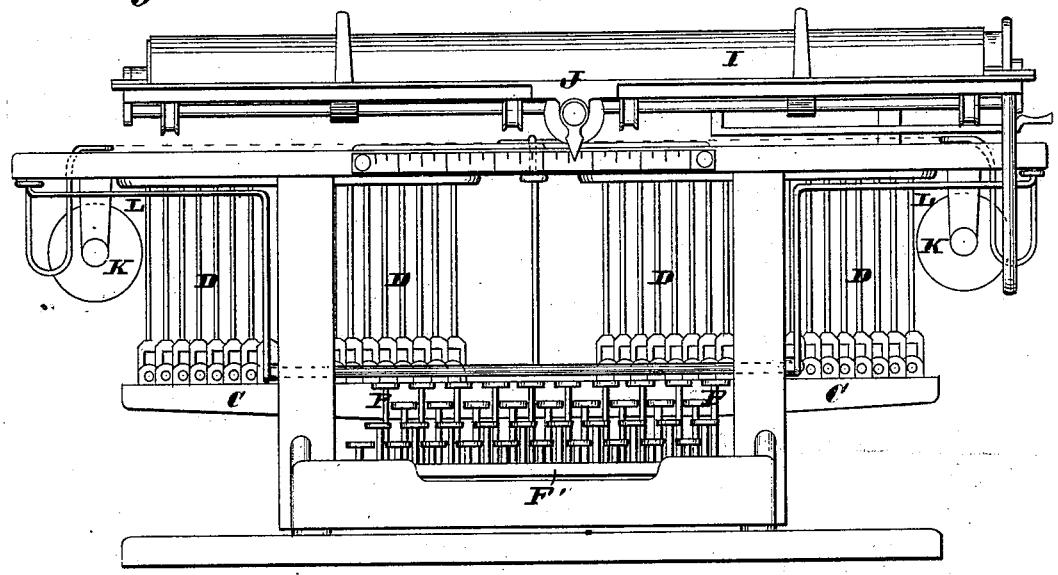
Attest:
Inventor:
Henry Orpen
By Knight Bros
attys
N. PETERS. Photo-Lithographer, Washington, D. C.

UNITED STATES PATENT OFFICE.

HENRY ORPEN, OF ST. LOUIS, MISSOURI.

TYPE-WRITING MACHINE.

SPECIFICATION forming part of Letters Patent No. 284,570, dated September 4, 1883.

Application filed April 6, 1883. (No model.)

*To all whom it may concern:*

Be it known that I, HENRY ORPEN, of the city of St. Louis, in the State of Missouri, have invented a certain new and useful Improvement in Type-Writing Machines, of which the following is a full, clear, and exact description, reference being had to the accompanying drawings, forming part of this specification, and in which—

Figure 1:
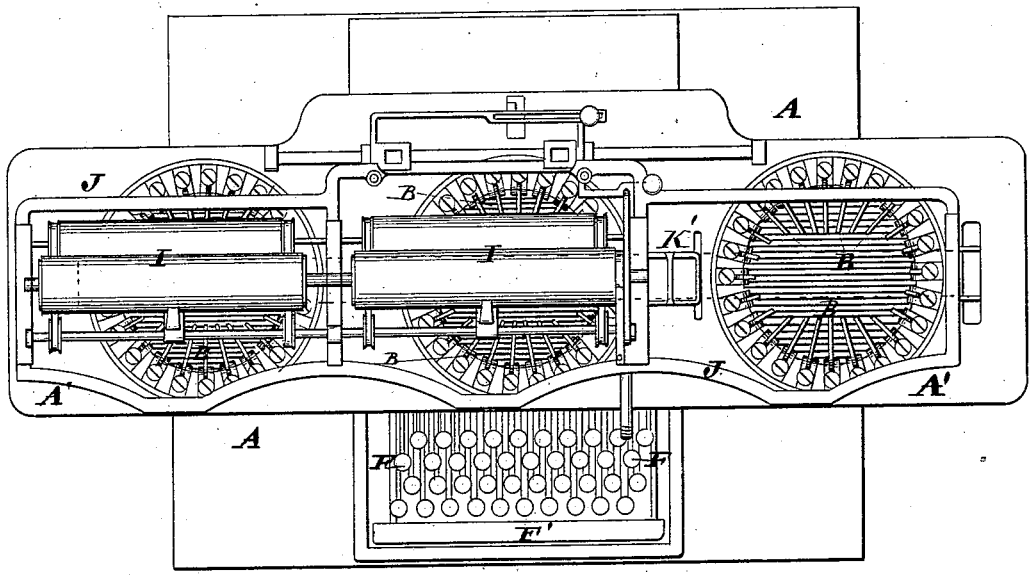
Figure 2:
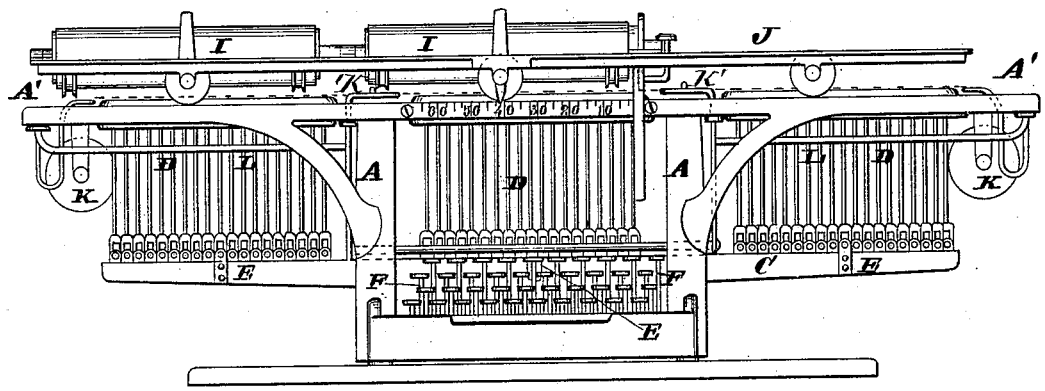
Figure 3:

Figure 1 is a top view; Fig. 2, a front view; Fig. 3, a detail sectional view; Fig. 4, a top view, and Fig. 5 a front view, the two latter figures illustrating a modified form of my invention.

My present invention consists, broadly, in a type-writing machine constructed with two or more sets of type-carrying levers operated simultaneously by a single set of keys, the object of the machine being to produce fac-simile manuscripts.

Referring to the drawings, A represents the frame of the machine.

B represents the circles of type-carrying levers, of which there may be two or more. I have shown three as my preferred number. I prefer to construct and arrange the levers of each set or circle as they are now arranged in the Remington machine; but I do not wish to confine myself to any special construction or arrangement thereof. The levers are connected to bars C by rods D, there being a bar for each lever of a circle. The corresponding levers of the different sets or circles are connected with the same bar, as shown at E, Fig. 2, so that when a bar is pulled down the same levers of the different circles will be operated. The bars C are connected to the finger-keys F by any suitable means. I have shown them connected by rods G (see Fig. 3) passing through them, and in order that the springs beneath the keys (not shown) may also sustain the bars, I have placed sleeves or tubes H between the keys and bars through which the connecting-rods pass. I claim no novelty in this application in the construction and arrangement of the keys, nor of the spacing-bar F', and I prefer to construct and arrange them on the plan of the Remington machine. Each bar C is of course connected to a separate key, and to the key corresponding with the type-levers connected to it. Each key is connected to its bar midway between the points of connection of the two outer levers, which locates it directly beneath the point of connection of the central lever, and thus the ends of the bar are pulled down evenly and together.

J represents the carriage, which I prefer to operate in the same manner as the carriage of the Remington machine is operated, (though I do not confine myself to any particular way of operating it,) and which is constructed to carry three sets of feed and printing rollers, I, the shaft of the printing-rollers preferably extending through all three of them, as shown in Fig. 1; or the rollers may be made sufficiently long to extend all the way across the carriage, as shown in Figs. 4 and 5. There is nothing peculiar about the arrangement of the rollers of each set. I prefer to arrange them also as in the Remington machine.

The frame of the machine has extended ends A' to support the carriage and the ribbon-rollers K. The shifting devices of these ribbon-rollers are, as I prefer to construct them, the same as in Remington machine. I have shown two of them, one near each end of the machine, connected by horizontal bars or rods L, (see Fig. 2,) and thus the two devices of the two rollers are shifted simultaneously. The ribbon between the rollers passes through suitable guides, K'. (See Fig. 1.) It will thus be seen that with this improved machine a single operator can produce as many fac-simile copies or manuscripts as desired with as little labor and in the same time as it takes to produce a single copy with a machine constructed with a single set of type-carrying levers.

In Figs. 4 and 5 I have shown a machine constructed with two sets of type-carrying levers, the keys in this case being located between the circles, and I have shown one continuous printing-roller. Other circles may of course be added. These figures show how or where the keys would be located in a machine having an even number of circles—that is, they would be located between the two central circles—and Figs. 1 and 2 show how they would be located in a machine having an odd number of circles—that is, directly beneath the central circle.

In Fig. 1 one pair of the rollers I are not shown, and in Figs. 2, 4, and 5 the type-carrying levers are not shown, the object of leaving these parts off being to show the parts beneath, in Fig. 1 the levers being shown better by leaving the rollers off, and in the other figures the bars and connecting-rods are more clearly shown by leaving the levers off.

I claim as my invention—

1. A type-writing machine having two or more circles or sets of type-carrying levers connected to a single set of keys, substantially as and for the purpose set forth.

2. A type-writing machine having two or more circles or sets of type-carrying levers connected to a single set of keys by means of rods and transverse bars, substantially as shown and described, for the purpose set forth.

3. A type-writing machine having two or more circles or sets of type-carrying levers connected to a single set of keys by means of rods and transverse bars, substantially as shown and described, the rods between the bars and keys being surrounded by sleeves or tubes, for the purpose set forth.

4. A type-writing machine having two or more circles or sets of type-carrying levers, a single set of operating-keys with which said levers are connected, and a single carriage carrying the feed and printing rollers, substantially as shown and described, for the purpose set forth.

HENRY ORPEN.

Witnesses:
SAML. KNIGHT,
GEO. H. KNIGHT.